Figure 1:
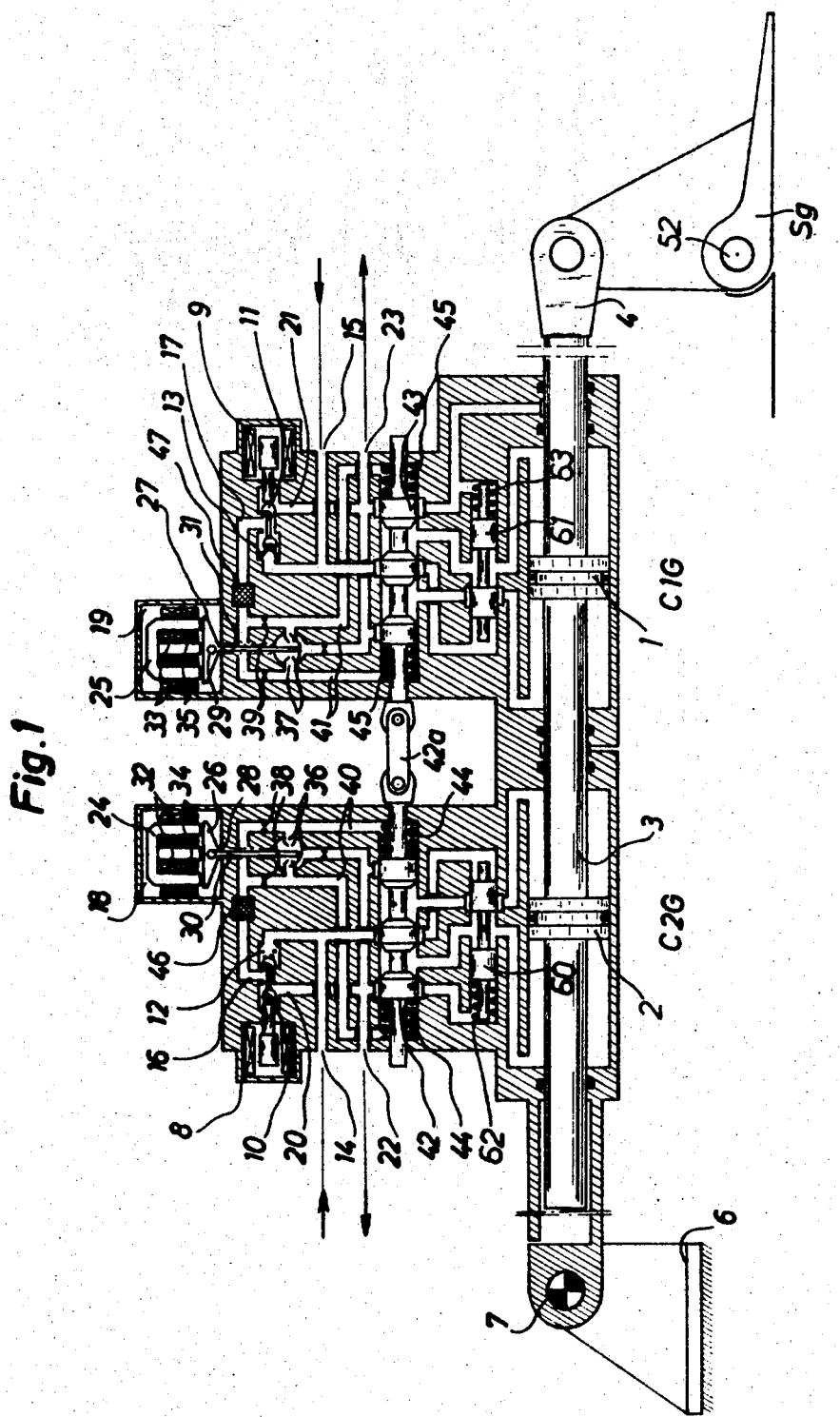

United States Patent

[11] 3,543,641

[72] Inventor Henri Deplante
         Paris, France
[21] Appl. No. 718,078
[22] Filed April 2, 1968
[45] Patented Dec. 1, 1970
[73] Assignee Avions Marcel Dassault
         Saint-Cloud, Hauts-de-Seine, France
         a company of France
[32] Priority May 8, 1967
[33]          France
[31]          No. 105,607

[54] CONTROL FOR SPOILERS AND LIKE AERODYNAMIC ACTUATORS OF AIRCRAFT
10 Claims, 3 Drawing Figs.

[52] U.S. Cl. .................................................. 91/361,
            91/413, 91/461, 91/438
[51] Int. Cl. ................................................F15b 13/16,
            F15b 13/06

[50] Field of Search............................................ 91/363(A),
            363, 411, 411(A), 411(A1), 413(Cursory), 361;
            244/76, 71(Cursory)

[56]            References Cited
            UNITED STATES PATENTS
3,338,138  8/1967  Wood............................. 91/411

Primary Examiner—Paul E. Maslousky
Attorney—Watson, Cole, Grindle & Watson

ABSTRACT: This invention relates to an electric hydraulic device for actuating aerodynamic elements such as spoilers in an aircraft, and comprises for each controlled element a duplex system comprising two hydraulic jacks independently supplied with fluid through coupled distributors the operation of which is controlled by two servovalves fed with electrical control pulses and providing a fluid pulse output. The invention is particularly useful in connection with variable geometry aircraft and has the advantages of offering a high degree of flexibility suited to various applications and of providing for the ready incorporation of safety features.

Patented Dec. 1, 1970

3,543,641

Sheet 1 of 2

Inventor
Henri Déplante
BY
Watson, Cole, Grindle + Watson
Attorneys

CONTROL FOR SPOILERS AND LIKE AERODYNAMIC ACTUATORS OF AIRCRAFT

This invention relates to an actuator device for operating aerodynamic elements in aircraft, which device is particularly suitable as a means of allowing the pilot to operate spoilers from the cockpit.

The device is of the electrohydraulic type, including hydraulic rams which are associated with the elements to be controlled and are controlled by electrical pulses initiated by the pilot. The device is thus particularly advantageous for use in the context of variable geometry aircraft, since it is relatively easy to pass electrical conductors through elements, such as the hinges, linking the movable wings to the fuselage of the aircraft.

Considered in relation to mechanical control devices, the device proposed in accordance with the invention also offers the advantage of a high degree of flexibility in adaptation to different applications, and of avoiding the need for relatively complex linkages to produce the requisite law of motion in the controlled elements, which law may be a saturated, asymmetric proportional law, of fixed or variable slope, due to the provision of electronic amplifiers in an electric control circuit.

The device according to the invention comprises the combination, for each of the controlled elements, of two hydraulic jacks, preferably operated in tandem and supplied through separate hydraulic circuits, so that a breakdown in one circuit does not affect the other, two distributors respectively associated with the said jacks in order to control the fluid supply to them, these distributors being mechanically coupled with one another, two servovalves which receive the electrical control pulses and transform them into impulses for the distributors, and finally two solenoid valves associated respectively with the aforesaid servovalves and controlling the fluid supply of said servovalves.

The servovalves receive not only the electrical control pulses initiated by the pilot, but also electrical pulses which depend upon the position of the aerodynamic element controlled, in order thus to achieve feedback between this position and that of the control operated by the pilot.

Preferably, the device will comprise two electrical control and feedback circuits governing servomotors, each of these circuits incorporating, in respect of each servomotor, a servovalve and the corresponding solenoid valve. Switching elements are provided so that in the event of malfunctioning of the control circuit in operation, the other one can automatically replace it. Other switching elements are likewise provided so that in the event of a defect in the second circuit, the two solenoid valves of each servomotor simultaneously supply hydraulic fluid to the associated servovalves, these latter at the same time being electrically operated in order to place the distributors of the two jacks in the positions corresponding to return of the controlled aerodynamic elements into the safe position.

To this end, the servovalves may be provided with a safety drive coil, the one primarily operative being the one responsible for the feedback control.

In a preferred arrangement, electrical comparators receive the control pulses and the pulses arising due to the position of the controlled elements. These comparators thus produce a result which is a measure of the positional error, and which is applied to the switching elements. The latter are controlled so that they operate beyond a certain threshold.

Further features of the invention will be apparent from the ensuing description of a preferred arrangement, given by way of example with reference to the accompanying drawings.

Figure 2:
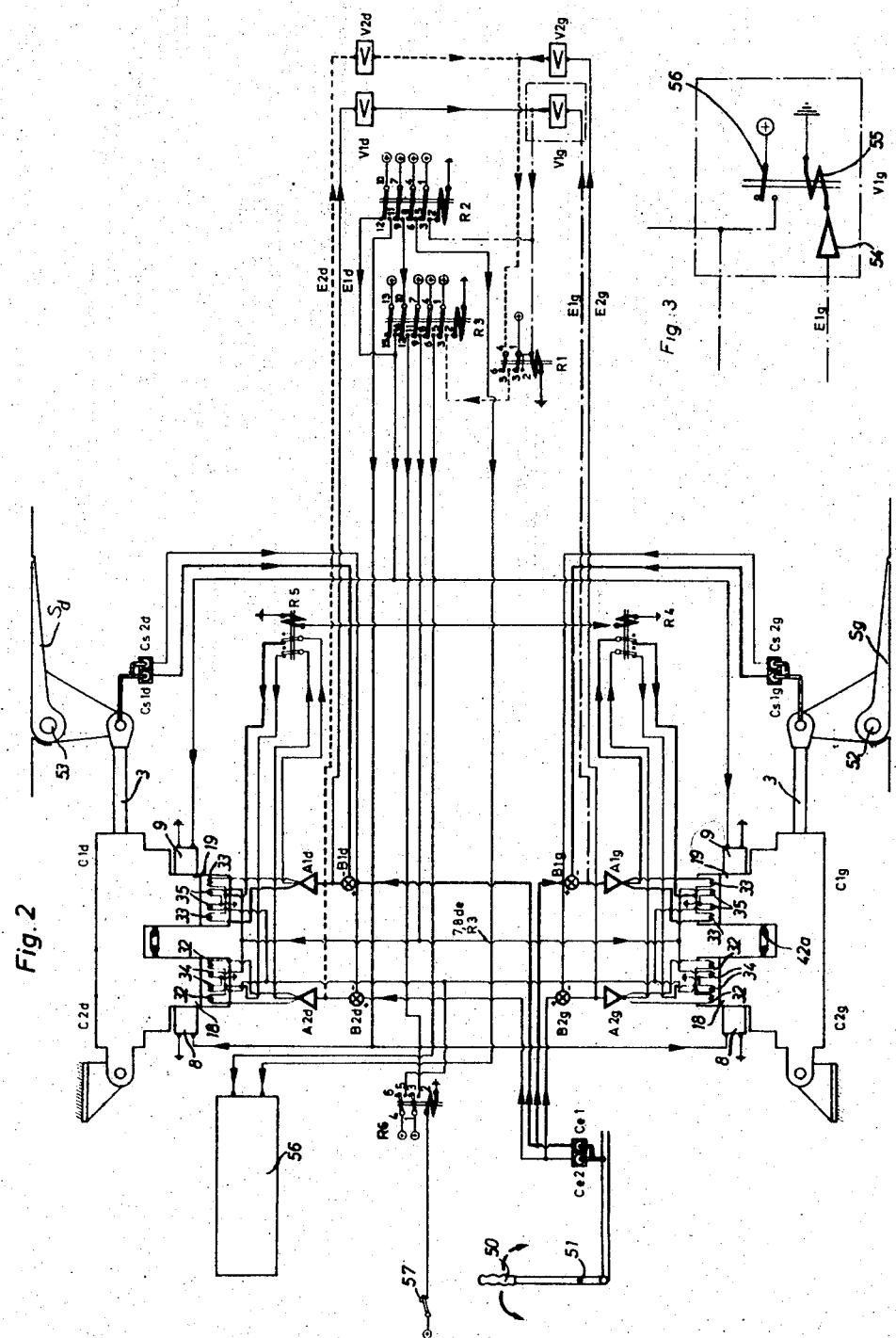
Figure 3:
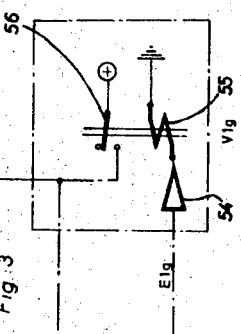

In the drawings:

FIG. 1 is a schematic sectional view of the servomotor of a spoiler, with two hydraulic jacks in tandem and their hydraulic distributor, the associated servovalves and the solenoid valves which control the hydraulic supply to said servovalves;

FIG. 2 schematically illustrates the electrical control and feedback circuits; and FIG. 3 schematically illustrates the design of one of the switching elements or monitor locks.

We refer first to FIG. 1, which shows an electrohydraulic servomotor group. For each of the aircraft's aerodynamic elements to be operated, this group is duplicated. It comprises a two-part jack $C_1g$ and $C_2g$, the pistons 1 and 2 of which are in tandem on a single piston rod 3 the free end of which is mechanically linked to the element to be controlled, for example to a spoiler S (FIG. 1 illustrates the port spoiler $Sg$, pivoting about the spindle 52, this spoiler being shown retracted into the wing of the aircraft). The block constituted by the jack cylinders and the various accessories attached thereto, which accessories will be described hereinafter, is connected to the airframe 6 through a joint 7 at the end opposite the operating end of the piston rod 3.

A solenoid valve 8 or 9, as the case may be, is associated with each of the jack bodies, the armature of the solenoid valve controlling a dumbbell shaped valve member 10, 11, associated with a return spring 12, 13. This dumbbell valve member is arranged in a passage 14, 15 supplying hydraulic fluid under pressure, a supply passage 16, 17 of a servovalve 18, 19 which will be described hereinafter, and a passage 20, 21 communicating with the hydraulic return line 22, 23.

The supply passages 14, 15 for the hydraulic fluid are independent of one another and are connected to two separate fluid pressure sources.

The servovalves 18, 19 are of the oscillating vane type, each comprising a drive system incorporating an E-shaped magnetic circuit 24, 25 controlling the rotation of an armature 26, 27 about a pivot 28, 29. This armature is integral with a vane 30, 31, which thus oscillates about the pivot 28, 29.

Each of the E-shaped magnetic circuits is associated with four coils, namely:

two main coils 32, 33 which, in each servovalve, are operated in push-pull from the outputs of amplifiers ($A_1g$, $A_1d$, $A_2g$, $A_2d$, FIG. 2), and provide positional feedback in roll control;

two other coils 34, 35 which enable a fixed controlling magnetic flux to be produced for "all or nothing" control in the following two cases: flight with the spoilers deployed, in the event of breakdown of the control circuits as will be described hereinafter, and operation as flaps, in particular whilst taxiing.

The coils 34 and 35 are designed in a manner such that the magnetic flux which they produce is stronger than the maximum magnetic flux which can be generated by the feedback coils 32 and 33.

Each of the vanes 30, 31 oscillates between two mutually opposite jets of a pair of hydraulic jets 36, 37, each of these pairs being supplied, when the corresponding solenoid valve 8 or 9 is energized, with high pressure hydraulic fluid fed from passage 14 or 15, across calibrated orifices 38, 39 which produce an appropriate pressure drop. The pressure downstream of each of the calibrated orifices (that is to say below these orifices in the case shown in FIG. 1) is thus a function of the flow rate of the jets downstream of said orifice, i.e. is a function of the position of the corresponding vane 30, 31. The arrangement thus forms a kind of hydraulic potentiometer.

The pressure downstream of the said calibrated orifices 38, 39 are transmitted through the passage 40, 41, to the end faces of a distributor spool 42, 43. Opposed springs 44, 45 are provided to bias each of the distributors into the neutral position shown in the drawing, in which position each distributor isolates the two working spaces of the jack associated with it.

The two spools 52, 43 are mechanically coupled together through a link 42a.

A filter 46, 47, located upstream of the calibrated orifices, prevents them from being blocked by any impurities present in the hydraulic circuit.

In FIG. 1, it has been assumed that the solenoid valve 9, associated with the body $C_1g$, has been energized, so that it has placed its valve member 11 in the position shown, in which high pressure hydraulic fluid from passage 15 flows through the passage 17 and thus supplies the two jets 37 across the calibrated orifices 39. The control coils 33 are not energized and the vane 31 is in its central position, in which the flow rates of the two jets 37 are equal.

The pressure in the passages 41 are therefore the same so that the distributor 43 remains in its neutral position, with the springs 45 in equilibrium. The same applies to the distributor 42, mechanically coupled by the link 42a to the distributor 43, and it should be pointed out here that the solenoid valve is not energized so that the passage 16, as well as the jets 36 associated with the vane 30, is isolated from the high pressure passage 14 and is instead in communication across the valve member 10 with the passage 20 connected to the return line 22.

The working spaces of the two jacks, full of hydraulic fluid, are therefore cut off and the aerodynamic element of the aircraft, which is connected to the extremity 4 of the piston rod 3 of the two jacks, is consequently locked in position.

If one of the control windings 33 is energized or supplied with a current higher than that flowing through the other, the corresponding extremity of the armature 27 is pulled up and this armature therefore pivots about its pin 29, moving the vane 31. This vane therefore tends to reduce the flow rate of the jet 37 which it approaches, and to increase the flow rate of the other one. The consequence is a state of imbalance in the pressures in the two passages 41 and, therefore, a movement on the part of the distributor spool 43, which movement is transmitted to the distributor spool 42. Depending upon the direction of displacement, these distributors admit high pressure to one or the other of the faces of the pistons 1 and 2, at the same time communicating the particular opposite faces of these pistons with the return line 22, 23. The pistons are thus shifted and their movement is transmitted to the aerodynamic element which is fixed to the end 4 of the piston rod 3.

Each of the jack bodies is associated with a bypass control spool 60, 61, biased by a spring 62, 63 at that end of the spool which is permanently in communication with the low pressure return 22, 23, the other end of the said spool being subjected to the high pressure prevailing in the passage 14, 15. Whilst this high pressure prevails, these spools are moved into the position shown in FIG. 1, the return springs 62, 63 therefore being compressed. In the event of a breakdown in one of the hydraulic circuits, the port side circuit for example, the high pressure disappears from the right-hand extremity of the corresponding spool 60, and the spring 62 associated with this spool moves it towards the right, in FIG. 1, so that a bypass communication is established between the two working spaces of the jack at either side of the piston 2. In this condition, only the right-hand section, comprising the piston 1, remains operative. It can operate normally without the other section producing an inordinate degree of braking.

Considering the servovalves 18, 19, that one of the windings 34, 35 which is located at the right in each of the E-shaped magnetic circuits 24, 25, is intended, when energized, to return the controlled aerodynamic element into a safe position, for example, in the case of a spoiler, to place it in the retracted position.

If, for example, we consider the servovalve 19 and its right-hand winding 35, it will be seen that energizing this winding 35 has the effect of rocking the armature 27 in an anticlockwise direction, so that the associated vane 30 produces maximum throttling of the right-hand jet 37. Thus, the high pressure at the right-hand end of the spool 43 reaches a maximum, so that the rod 3 of the jacks $C_1g$, $C_2g$, is moved towards the left in the drawing, retracting the spoiler $Sg$ into the wing surface, as FIG. 1 shows.

On the other hand, that of the windings 34, 35 which is located at the left-hand side of the magnetic circuits 24 and 25, has the effect, when energized, of placing the corresponding spoiler in the position of maximum effectiveness.

It will be understood, from the following discussion, that the first-mentioned action is automatically triggered by the set of safety feedback arrangements, when a breakdown in the control systems takes place, whilst the second of the actions, which, in the case of spoilers, may be useful in order to make them play the part of flaps, in particular during taxiing, is something which is initiated arbitrarily by the pilot, as and when required.

The electrical control circuits as well as the positional feedback arrangement providing feedback between the control operated by the pilot and the controlled elements, which arrangement employs the windings 32 and 33 of the servovalves, will now be described making reference to FIG. 2.

In this FIG., $Sg$ (port spoiler) and $Sd$ (starboard spoiler) respectively indicate the two spoilers to whose control it has been assumed the present device is applied. The device may, of course, be applied in a similar manner to other elements arranged symmetrically at port and starboard of longitudinal plane of symmetry of the aircraft.

The reference 50 indicates the control lever operated by the pilot, which lever can pivot about the spindle 51 in both directions; $C_1g$, $C_2g$ indicate a double servomotor unit which has been described in relation to FIG. 1, and whose piston rod is mechanically linked to the port spoiler, $Sg$, pivoting about the spindle 52; indicate a double servomotor, identical to that designated $C_1g$, $C_2g$, whose piston rod 3 is, in the same fashion, connected to the starboard spoiler $Sd$, pivoting about 53.

The control lever 50 is associated with two input transducers $Ce1$, $Ce2$, each supplying to its particular associated electrical circuit, a signal which is a function of the position of the lever 50. Associated with each of the controlled elements, that is to say with each of the spoilers in the case under consideration, there are similarly two output transducers, namely $Cs1g$, $Cs2g$ for the port spoiler, $Cs1d$, $Cs1d$ for the starboard spoiler, each of these transducers likewise supplying to that of the electrical circuits with which it is associated a signal which is a function of the position of the particular controlled element.

In the first circuit, the signal emanating from the input transducer $Ce1$ is applied to two comparator circuits $B_1g$, $B_1d$, which on the other hand are also respectively supplied with signals emanating from the output transducers $Cs1g$ and $Cs1d$. These comparator circuits, which need not be described here since they are well known as such, furnish at their output a signal which is proportional to the difference between the two signals received, and of the same sign as this difference. The output signal is amplified respectively by an amplifier $A_1g$ and $A_1d$, the output of which drives the control windings 33 of the respective servovalves 19 in the first circuit, in push-pull, through the contacts of the relays R4 and R5.

Similarly, in the second circuit, the signal emanating from the input transducer $Ce2$ is supplied to two comparator circuits $B_2g$, $B_2d$, which on the other hand are also supplied respectively with the signals from the output transducers $Cs2g$, $Cs2d$, furnishing the difference to amplifiers $A_2g$ and $A_2d$. The output of these amplifiers drives the windings 32 of the servovalves 18 of the second circuit, in push-pull, through contacts of the same relays R4 and R5.

It goes without saying that in the case described, namely the control of spoilers, and for that matter in the case of any other roll attitude control elements, the electrical device will be regulated so that the servovalves of the port servomotor and those of the starboard servomotor are supplied with mutually oppositely directed commands in response to any given movement of the lever 50, so that if, for example, the said lever is operated in the direction of one of the arrows, one of the spoilers remains retracted (its jack being up against a mechanical stop), whilst the other is raised, and vice versa if the lever 50 is operated in the direction of the other arrow.

Associated with each of the comparator circuits $B_1g$, $B_1d$..., there is a switching element, or electrical lock $V_1g$, $V_1d$ (first circuit), $V_2g$, $V_2d$ (second circuit). Each of these locks receives the output signal (which may also be termed the error signal) from the comparator circuit $B_1g$, $B_1d$... with which it is associated. These locks are constituted in a manner such that they operate when the received signal and, consequently the error between the position of the control lever 50 and that on one of the controlled elements $Sg$ and $Sd$, exceeds a certain threshold level.

In FIG. 3, by way of example, the design of the switching element or lock $V_1g$ has been illustrated. It comprises an amplifier 54 which amplifies the error signal, a relay 55 connected to the amplifier output, and a moving contact 56 controlled by said relay.

These locks are associated with relays R1, R2, R3.

In normal operation, the first electrical control circuit is in service. The contacts of the various relays are in the positions shown in FIG. 2 and it will be seen, in particular, that the contact 10, 12 of the relay R2 is causing energization of the solenoid valves 9. The consequence is that in each of the dual servomotor arrangements, the section C1 is the master whilst the section C2, whose solenoid valve 8 is not energized, since the supply is cut by the contact 10, 11 of the relay R2, is the slave.

As long as the control arrangements of the first circuit operate properly, the positions of the spoilers Sg and Sd accord sufficiently well with the positions of the control lever 50 for the error signals at the outputs of the comparator circuits $B_1g$ and $B_1d$ to remain small.

We will now consider, consecutively, what happens when there is a breakdown in one of the sections C1, for example in the unit $C_1g$, and then a breakdown in one of the sections C2, for example in the unit $C2d$.

In order to facilitate the reading of FIG. 2, a thick continuous line has been used to indicate the normal feedback circuit corresponding to the unit $C_1g$ and $C_1d$, a thick chain-dotted line to indicate the circuit which comes into operation as a standby following a first breakdown, in the unit $C_1g$, and finally a thick broken line to indicate the standby circuit which comes into operation following a second breakdown, in the unit $C_2d$.

In the event of a breakdown in one of the units $C_1g$ or $C_1d$ ($C_1g$ in case in question) the error voltage $E_1g$ at the output of the comparator circuit $B_1g$, after amplification in 54 (FIG. 3), exceeds the triggering threshold of the relay 55 in the lock $V_1g$. This relay changes state, simultaneously energizing the relays R1 and R2.

In the relay R1, closure of the contact 1, 2 causes this relay to switch in its own holding circuit and closure of the contact 4, 5 sets into operation the monitors of circuit 2, namely the locks $V2g$ and $V2d$.

In the relay R2, the closure of the contact 1, 2 causes this relay to switch in its own holding circuit, closure of the contact 4, 5 signals breakdown of circuit 1 on the panel 56 in the cockpit, closure of the contact 7, 8 cuts out feedback in the event of breakdown in the circuit 2, and finally, closure of the contact 10, 11 deenergizes the solenoid valves 9 of the two jacks and energizes the solenoid valves 8.

Continuity in operation has therefore been achieved but considering the jacks, the section 2 has become the master.

Let us now assume that a breakdown occurs in the second circuit, for example in the unit $C2d$.

The amplified error voltage $E2d$, exceeds the triggering threshold of the relay of lock $V2d$, causing the relay to change state.

The contact 4, 5 of the relay R1, closed at the time of the first breakdown, causes the relay R3 to be energized Closure of the contact 1, 2 of the relay R3 causes this relay to switch in its own holding circuit, closure of the contact 4, 5 of the relay R3 signals total failure on the panel 56, closure of the contact 7, 8 energizes the emergency retraction coil 34 or 35 on the four servovalves 18, 19, closure of the contact 10, 11 energizes the relays R4 and R5 which cut the high voltage at the output of the four amplifiers $A_1g$, $A_2g$, $A_1d$, $A_2d$, so that feedback to the four servovalves is inhibited, and, finally, closure of the contact 14, 15 reenergizes the solenoid valves 9 in the first circuit. The four solenoid valves 8, 9 are therefore simultaneously energized and since, considering the four servovalves 18, 19, the emergency retraction coil 34, 35 is energized, the spoilers remain retracted.

The system enables the pilot directly to operate both spoilers if he wishes to use them as flaps during the taxiing phase. All he has to do is to close the contact breaker 57, which is normally open. By this maneuver, the relay R6 is energized. Closure of the contact 1, 2 of this relay energizes the relays R4 and R5 which, as described hereinbefore, then cut the high voltage at the output of the four amplifiers $A_1g$, $A_2g$, $A_1d$, $A_2d$, inhibiting feedback. Closure of the contact 4, 5 energizes in each servovalve, that of the windings 34, 35 which, considering FIG. 1, is located at the left in each E-shaped magnetic circuit. The vanes 30, 31 of the servovalves then oscillate in the clockwise direction, causing the piston rods 3 of the jacks to move towards the right, fully deploying the two spoilers.

I claim:

1. In an aircraft having aerodynamic elements to be controlled, a control device for each controlled element comprising in combination:

a servomotor group incorporating two hydraulic jacks;

hydraulic lines for the independent supply of fluid to said jacks;

two distributors respectively controlling supply to said jacks of the fluid fed through said lines;

a mechanical coupling between said two distributors;

means for generating electrical control pulses;

two receivers for said control pulses; and means whereby said receivers respectively govern operation of said distributors, including two interruptor devices to connect and disconnect said respective receivers and distributors, and means connecting the respective receivers and interruptor devices in two electrical feed back circuits from the controlled element to the respective jacks.

2. In an aircraft having aerodynamic elements to be controlled, a control device for each controlled element comprising in combination:

a servomotor group incorporating two hydraulic jacks;

hydraulic lines for the independent supply of fluid to said jacks;

two coupled distributors respectively controlling supply to said jacks of the fluid fed through said lines;

two electrical feedback circuits from the controlled element to the respective jacks, each said circuit including a receiver for electrical control pulses, which receiver governs one of the said distributors, and also including an interruptor device to connect and disconnect said receiver from said distributor;

switching devices; and and automatic safety means whereby said switching devices are actuated in the event of failure associated with one operative feedback circuit to switch in the other circuit.

3. A device according to claim 2, including supplementary switching devices and supplementary automatic safety means whereby said supplementary switching devices are actuated in the event of failure of both feed back circuits to cause the controlled element to move to a safe position.

4. In an aircraft having aerodynamic elements to be controlled, a control device for each controlled element comprising in combination:

power means incorporating two hydraulic jacks having independent supply lines;

two coupled distributors respectively controlling supply of hydraulic fluid to said jacks;

means for generating electrical control pulses;

two servovalves comprising two distinct control windings, namely a standard normal operation control winding for receiving said control pulses, and an over riding safety operation control winding, said servovalves providing corresponding fluid output pulses fed to the respective distributors;

two solenoid valves for controlling supply of said fluid output pulses to said distributors; and electrical means for energizing said overriding safety operation control winding under safety requirement conditions.

5. A device according to claim 4, wherein each servovalve includes an E-shaped magnetic circuit and a vane positioned for oscillation under the control of said magnetic circuit, between two fluid jets leading to the distributors.

6. A device according to claim 4, wherein said means for generating electrical control pulses comprise a first means (Ce1, Ce2) responsive to pilot actuation, a second means (Cs1, Cs2) responsive to controlled element position, and means for balancing said first and second means against each other in servocontrol relationship.

7. A device according to claim 6, wherein said balancing means comprise two electrical comparison circuits (B1, B2) having each two inputs respectively connected to said first means and to said second means, and an output connected to a respective standard normal operation control winding (32, 33) of said two servovalves (18, 19).

8. A device according to claim 7, further comprising switching means (V1, V2) connected to the output of each of said comparison circuits and operable when said output exceeds a predetermined level, said servovalves (18, 19) and said solenoid valves (8, 9) being under the control of said switching means.

9. A device according to claim 6, wherein said means for generating electrical control pulses further comprise a third means (57) which is hand actuatable for neutralizing said second means, whereby only said first means remains effective.

10. In an aircraft having spoilers to be controlled, a control device for each spoiler comprising in combination:
two hydraulic jacks;
hydraulic lines for independent supply of fluid to said jacks;
two distributors respectively controlling supply to said jacks of the fluid fed through said lines;
a mechanical coupling between said two distributors;
pilot-actuable means for generating electrical control signals;
feedback means for generating electrical control signals as a function of the position of the spoiler;
comparison circuits each for comparing the control pulses generated by said two pulse generating means and providing an electrical differential output;
two receivers for receiving said differential outputs and providing a corresponding fluid output;
two hydraulic interruptor devices; and
and means interconnecting said receivers, interruptor devices and distributors to render said distributors normally controllable by said receivers but operable independently thereof in the event of a given action of said interruptors.